(12) United States Patent
Kodali et al.

(10) Patent No.: US 12,075,326 B2
(45) Date of Patent: Aug. 27, 2024

(54) NETWORK SLICING ENHANCEMENTS

(71) Applicant: Apple Inc., Cupertino, CA (US)

(72) Inventors: Sree Ram Kodali, Sunnyvale, CA (US); Ahmed M. Soliman, Munich (DE); Christian W. Mucke, Cupertino, CA (US); Huarui Liang, Beijing (CN); Oleg M. Moskalenko, Ben Lomond, CA (US); Rafael L. Rivera-Barreto, Santa Clara, CA (US); Sergey Sitnikov, San Jose, CA (US); Teck Yang Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 17/438,538

(22) PCT Filed: Nov. 16, 2020

(86) PCT No.: PCT/CN2020/128989
§ 371 (c)(1),
(2) Date: Sep. 13, 2021

(87) PCT Pub. No.: WO2022/099679
PCT Pub. Date: May 19, 2022

(65) Prior Publication Data
US 2022/0353780 A1    Nov. 3, 2022

(51) Int. Cl.
*H04W 40/02* (2009.01)
*H04L 45/302* (2022.01)
*H04W 40/24* (2009.01)

(52) U.S. Cl.
CPC ........... *H04W 40/02* (2013.01); *H04L 45/306* (2013.01); *H04W 40/24* (2013.01)

(58) Field of Classification Search
CPC .... H04W 40/02; H04W 40/24; H04L 45/304; H04L 45/306; H04L 45/3065; H04L 45/308; H04L 45/85; H04L 45/851
See application file for complete search history.

(56) References Cited

U.S. PATENT DOCUMENTS

2020/0187085 A1    6/2020    Jagannatha et al.
2020/0196315 A1    6/2020    Young et al.
(Continued)

FOREIGN PATENT DOCUMENTS

CN    108810993 A    11/2018
CN    109076448 A    12/2018
(Continued)

OTHER PUBLICATIONS

PCT/CN2021/095572 (Year: 2022).*
(Continued)

*Primary Examiner* — Siu M Lee
(74) *Attorney, Agent, or Firm* — Kowert, Hood, Munyon, Rankin & Goetzel, P.C.

(57) ABSTRACT

Apparatuses, systems, and methods for enhancement of network slicing for a UE. A UE may receive, from an AMF of a network, application related information associated with network slice data routing for data associated with an application. The information may be provided to the network by network slice customers. The UE may, in response to application initiation, determine traffic routing for data associated with the application. Traffic routing may be based on the application related information and a UE configuration associated with user privacy (e.g., user privacy setting) associated with the application. When the user UE configuration is enabled, the data may be routed via a default network slice and when the UE configuration is disabled, the data may be routed via a network slice indicated by the application related information. The UE configuration may (Continued)

Receive network slice traffic descriptors for applications associate with one or more NSCs
*1402*

↓

Provide to UEs of the network application related information based on network slice traffic descriptors
*1404* be indicated by the application via a Boolean flag and/or via a user interface setting.

20 Claims, 16 Drawing Sheets

(56) References Cited

U.S. PATENT DOCUMENTS

| | | | |
|---|---|---|---|
| 2022/0038986 A1* | 2/2022 | Soliman | H04W 40/246 |
| 2022/0039004 A1* | 2/2022 | Soliman | H04L 47/78 |
| 2023/0216740 A1* | 7/2023 | Guo | H04W 40/24 |
| | | | 709/223 |

FOREIGN PATENT DOCUMENTS

| | | |
|---|---|---|
| CN | 110431820 A | 11/2019 |
| CN | 110786034 A | 2/2020 |
| CN | 111614496 A | 9/2020 |
| CN | 111698725 A | 9/2020 |

OTHER PUBLICATIONS

CN 111698725A (Year: 2020).*
International Search Report for PCT Patent Application No. PCT/CN2020/128989, mailed Jul. 9, 2021.

* cited by examiner

Registration Request 902

| IEI | Information Element | Presence | Format | Length |
|---|---|---|---|---|
| ... | Extended protocol discriminator | Mandatory | Variable | 1 |
| | Security header type | Mandatory | Variable | 1/2 |
| | Spare half octet | Mandatory | Variable | 1/2 |
| | Registration request message ID | Mandatory | Variable | 1 |
| | ... | ... | ... | ... |
| | Network Slicing Capability | Optional | Variable | 1 |

FIG. 9B

| Network Slicing Capability | Enumerated | Application ID + OS ID | IPv4 Remote address | IPv6 Remote address | Protocol Identifier/Next Header Type | Remote Port | Remote Port Range | Security Parameter Index Type | Type of Service/Traffic Class Type | Flow Label Type | FQDN | DNN | Application ID | Connection Capabilities |
|---|---|---|---|---|---|---|---|---|---|---|---|---|---|---|
| | | | | | | | | | | | | | | |

FIG. 9C

| URSP Traffic Descriptor: Application Category | URSP Routing Descriptor: Network Slice ID |
|---|---|
| Gaming | 1 |
| Photo | 2 |
| Real Time Data | 3 |
| Streaming | 4 |
| Bulk Download | 5 |
| Default | 6 |

FIG. 12B

NETWORK SLICING ENHANCEMENTS

PRIORITY CLAIM INFORMATION

This application is a national stage application of International Application No. PCT/CN2020/128989, filed on Nov. 16, 2020, titled "Network Slicing Enhancements", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for enhancement of network slicing for a UE, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for enhancement of network slicing for a UE, e.g., in 5G NR systems and beyond.

For example, in some embodiments, a user equipment device (UE), such as UE 106, may be configured to may receive, from an AMF of a network, application related information associated with network slice data routing for data associated with an application. The UE may be configured to, in response to initiation of the application, determine traffic routing for data associated with the application. The traffic routing may be based, at least in part, on the application related information and/or a user privacy setting associated with the application and/or a UE configuration associated with user privacy. In some embodiments, when the user privacy setting is enabled (and/or when the UE configuration associated with user privacy is set to not use network slice routing for the application), the data may be routed via a default network slice and when the user privacy setting is disabled (and/or when the UE configuration associated with user privacy is set to use network slice routing for the application), the data may be routed via a network slice indicated by the application related information. The user privacy setting (and/or UE configuration) may be indicated by the application via a Boolean flag and/or via a user interface setting.

In some embodiments, to receive, from the AMF of the network, the application related information, the UE may be configured to transmit, to the AMF, a registration request message and receive, from the AMF, the application related information. The registration request message may include an indication of a network slice capability associated with the UE. The network slice capability may be indicated via a network slice capability information element. The network slice capability information element may include any, any combination of, and/or all of (e.g., at least one of and/or one or more of) an application ID (APP ID) and operating system ID (OS ID) (APP ID+OS ID), an IPV4 remote address, an IPV6 remote address, a protocol identifier and/or next header type parameter, a remote port, a security parameter index type, a type of service and/or traffic class type, a flow label type, an FQDN, a DNN, an APP ID, and/or connection capabilities, among other parameters associated with network slicing.

In some embodiments, to receive, from the AMF of the network, the application related information, the UE may receive application related information based on a Subscription Concealed Identifier (SUCI), e.g., that the UE provided to an application developer of the application. In some embodiments, to receive, from the AMF of the network, application related information, the UE may receive, from the AMF of the network, a policy message. The policy message may include an application category to network slice identifier (ID) mapping. In such embodiments, the determination of the traffic routing for data associated with the application is further based, at least in part, on the mapping.

As another example, in some embodiments, a network entity of a network, such as AMF 605, may be configured to receive, from one or more network slice customers (NSCs) (e.g., application developers), network slice traffic descriptors for applications associated with each NSC of the one or more NSCs. The network entity may be configured to provide to UEs, such as UEs 106, serviced by the network application related information associated with network slice data routing, e.g., based on the network slice traffic descriptors. The network slice traffic descriptors may be included in a AllocateNssi API parameter and/or a ServiceParameterCreate parameter included in a request message, e.g., in a an AllocateNssi request message.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 9B illustrates an example of a registration request message, according to some embodiments.

FIG. 9C illustrates an example of a network slice capability information element, according to some embodiments.

FIG. 12B illustrates an example of a mapping of application traffic category to network slice ID, according to some embodiments.

Figure 1A:
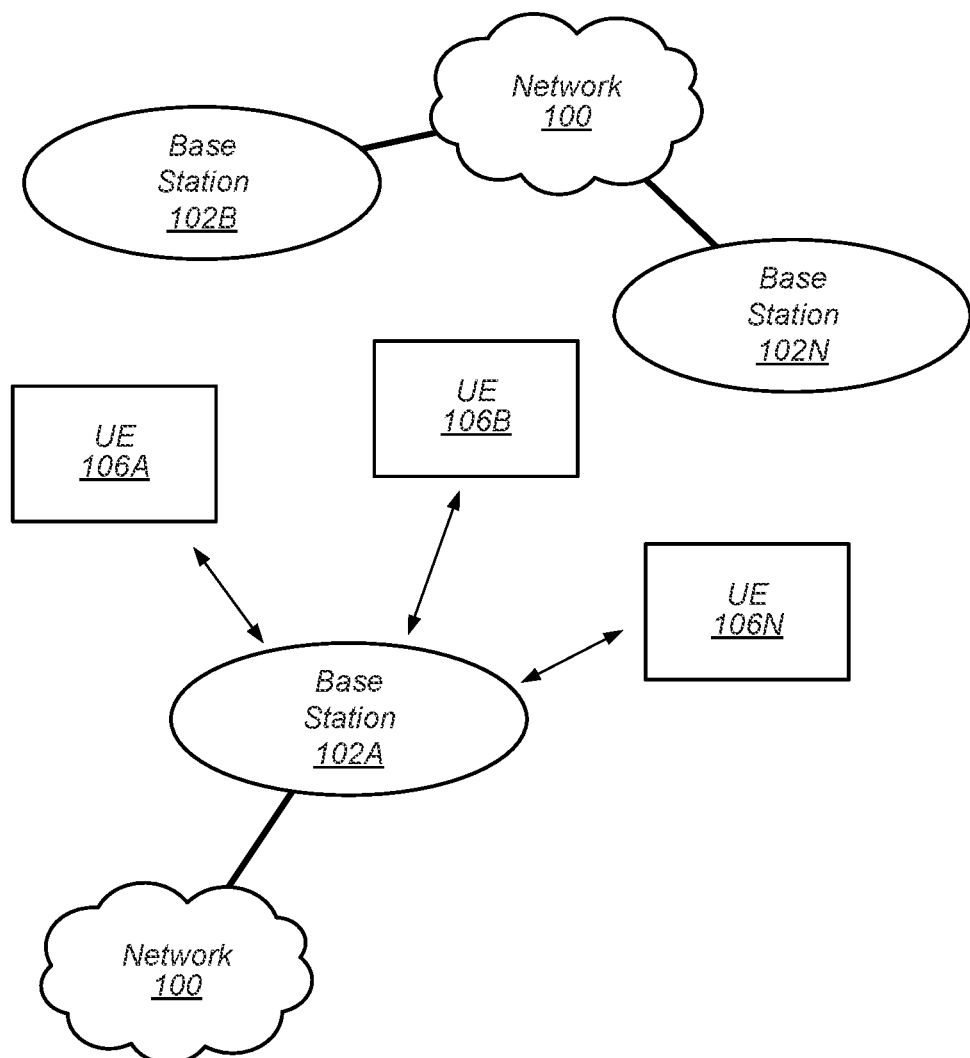
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device: a computer system memory or random access memory such as DRAM, DDR RAM, SRAM, EDO RAM, Rambus RAM, etc.: a non-volatile memory such as a Flash, magnetic media, e.g., a hard drive, or optical storage: registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHZ to 20MHZ. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
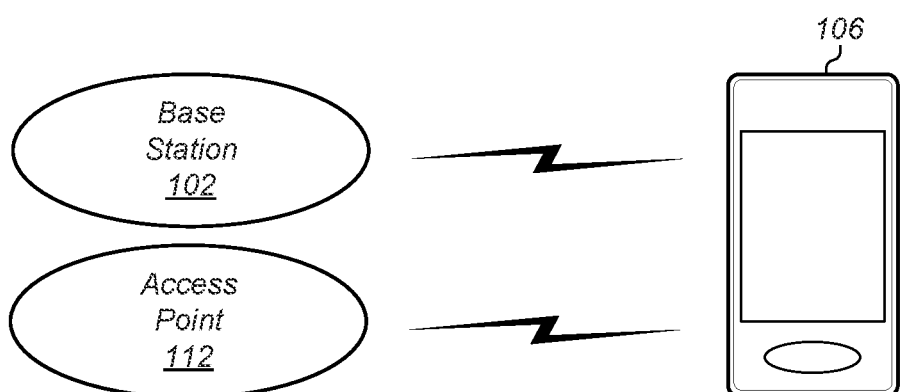
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, lxEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, lxEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1xEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
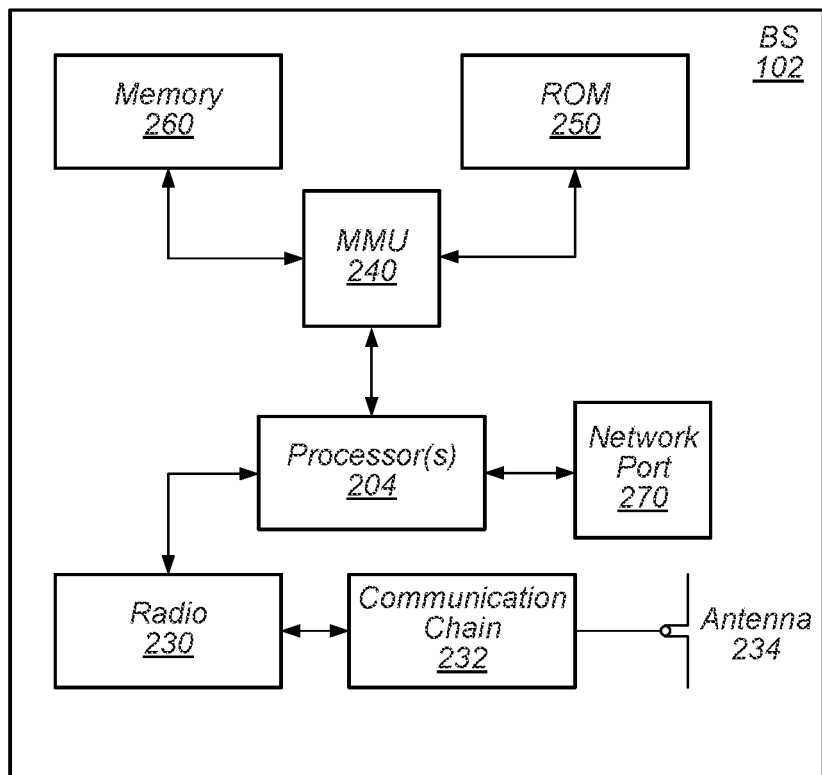
FIG. 2 illustrates an example block diagram of a base station, according to some embodiments.

FIG. 2: Block Diagram of a Base Station

Figure 3:
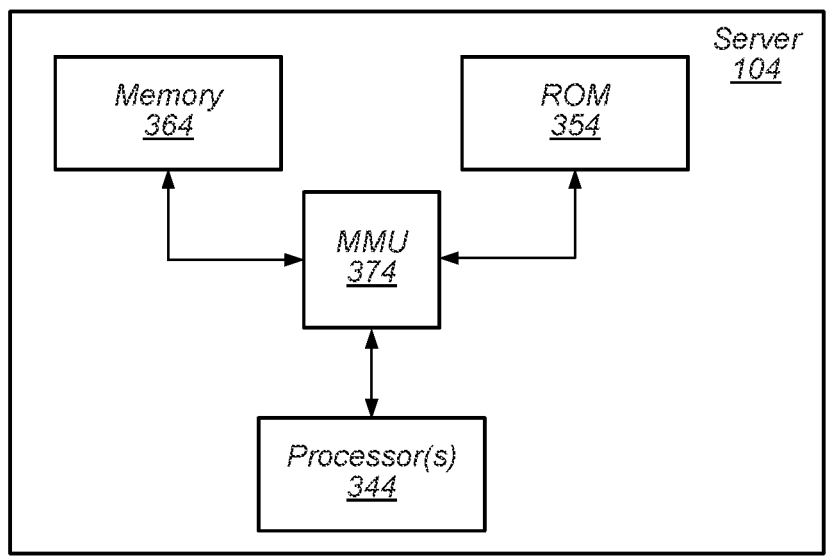
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232,

234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
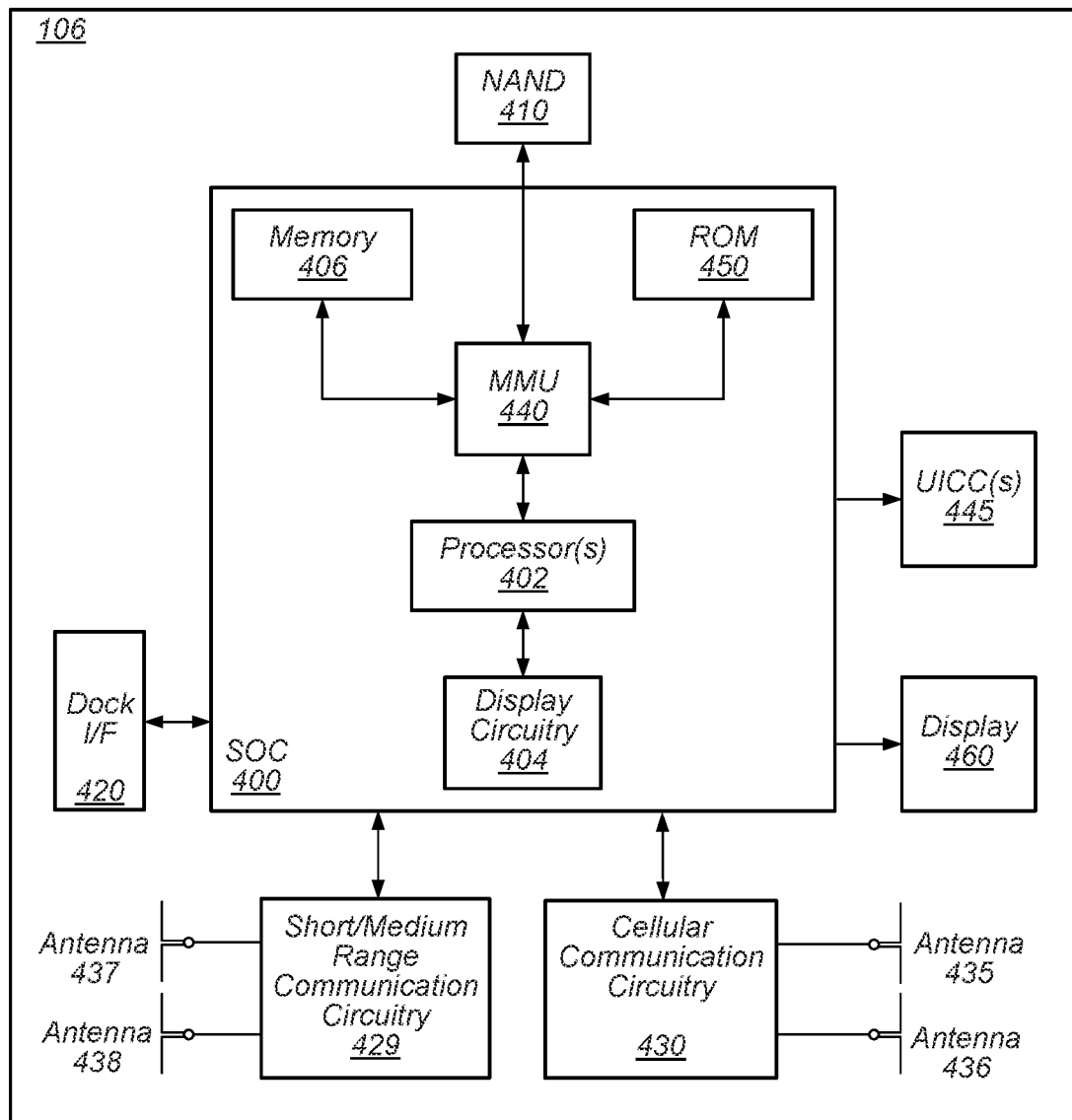
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively: directly or indirectly) to various other circuits of the communication device 106.

For example, the communication device 106 may include various types of memory (e.g., including NAND flash 410), an input/output interface such as connector I/F 420 (e.g., for connecting to a computer system: dock: charging station: input devices, such as a microphone, camera, keyboard: output devices, such as speakers: etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively: directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively: directly or indirectly) to the antennas 435 and 436 in addition to, or instead of, coupling (e.g., communicatively: directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity." is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMS 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality: in such an embodiment, a single one of the SIM(s) may execute multiple SIM applications. Each of the SIMs may include components such as a processor and/or a memory: instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VOLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440) may be included as a portion of the processor(s) 402.

As noted above, the communication device 106 may be configured to communicate using wireless and/or wired communication circuitry. The communication device 106 may be configured to perform methods for enhancement of network slicing for a UE, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
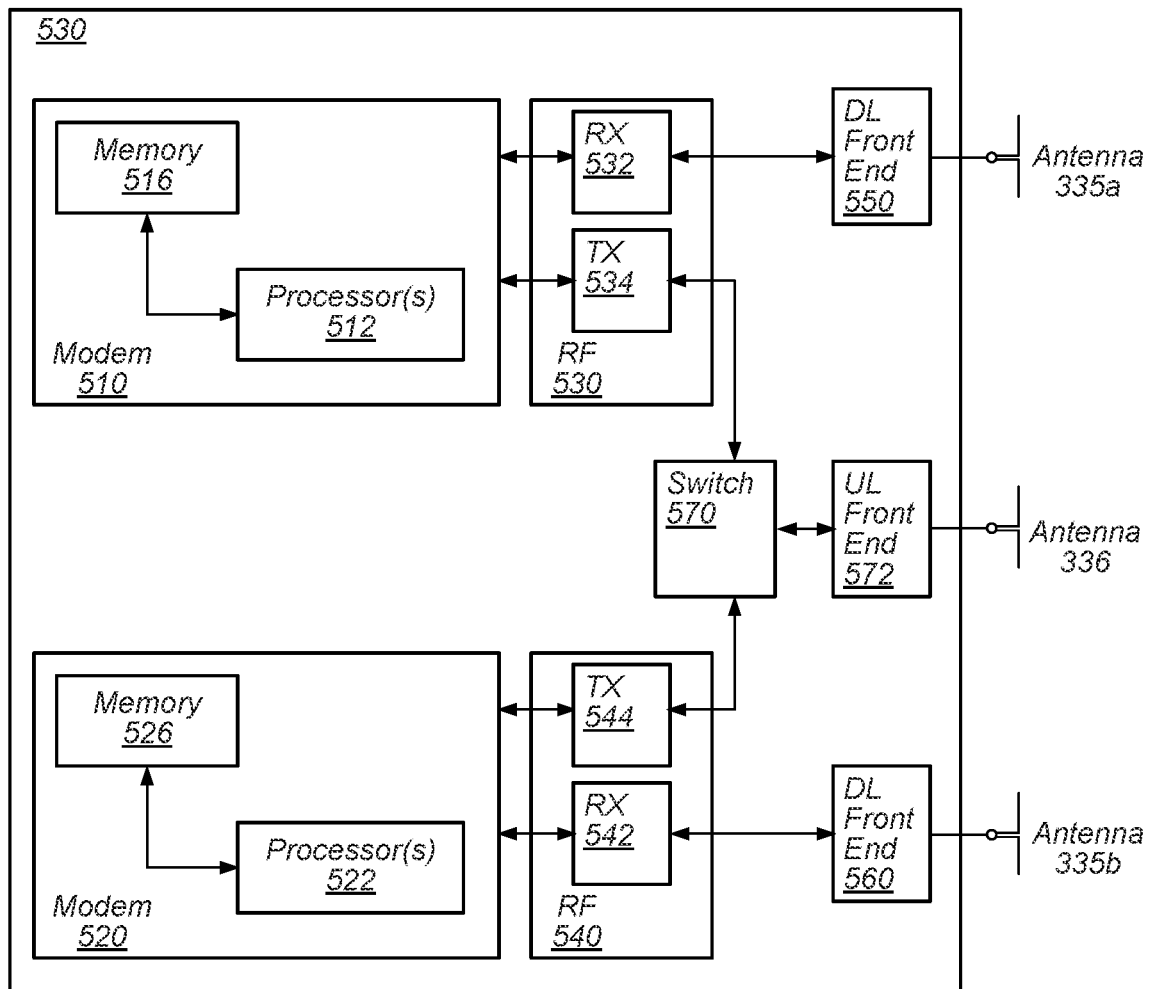
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively: directly or indirectly) to one or more antennas, such as antennas 435a-b and 436 as shown (in FIG. 4). In some embodiments, cellular communication circuitry 530 may include dedicated receive chains (including and/or coupled to, e.g., communicatively: directly or indirectly, dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods enhancement of network slicing for a UE, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
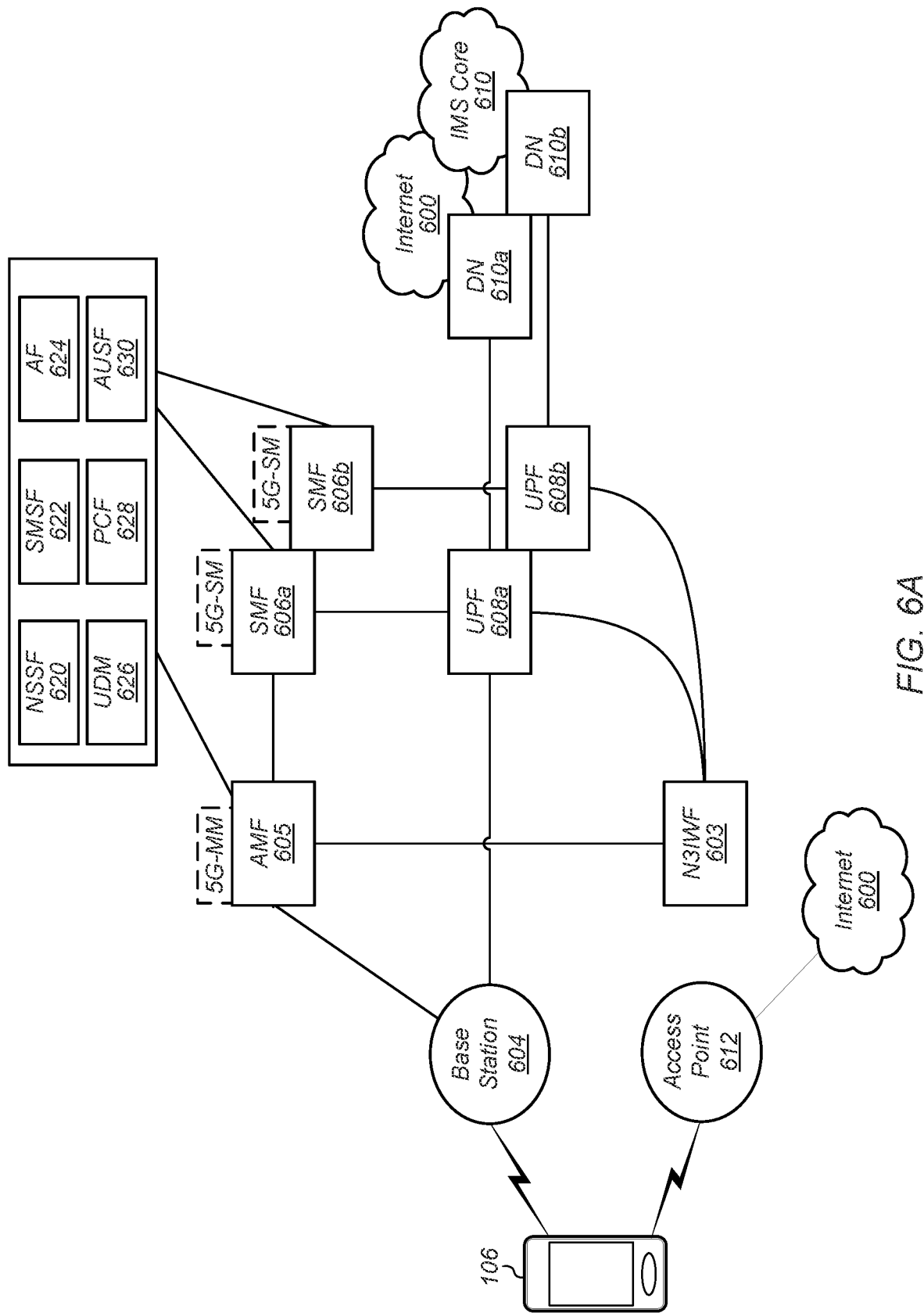
FIG. 6A illustrates an example of a 5G network architecture that incorporates both 3GPP (e.g., cellular) and non-3GPP (e.g., non-cellular) access to the 5G CN, according to some embodiments.
Figure 6B:
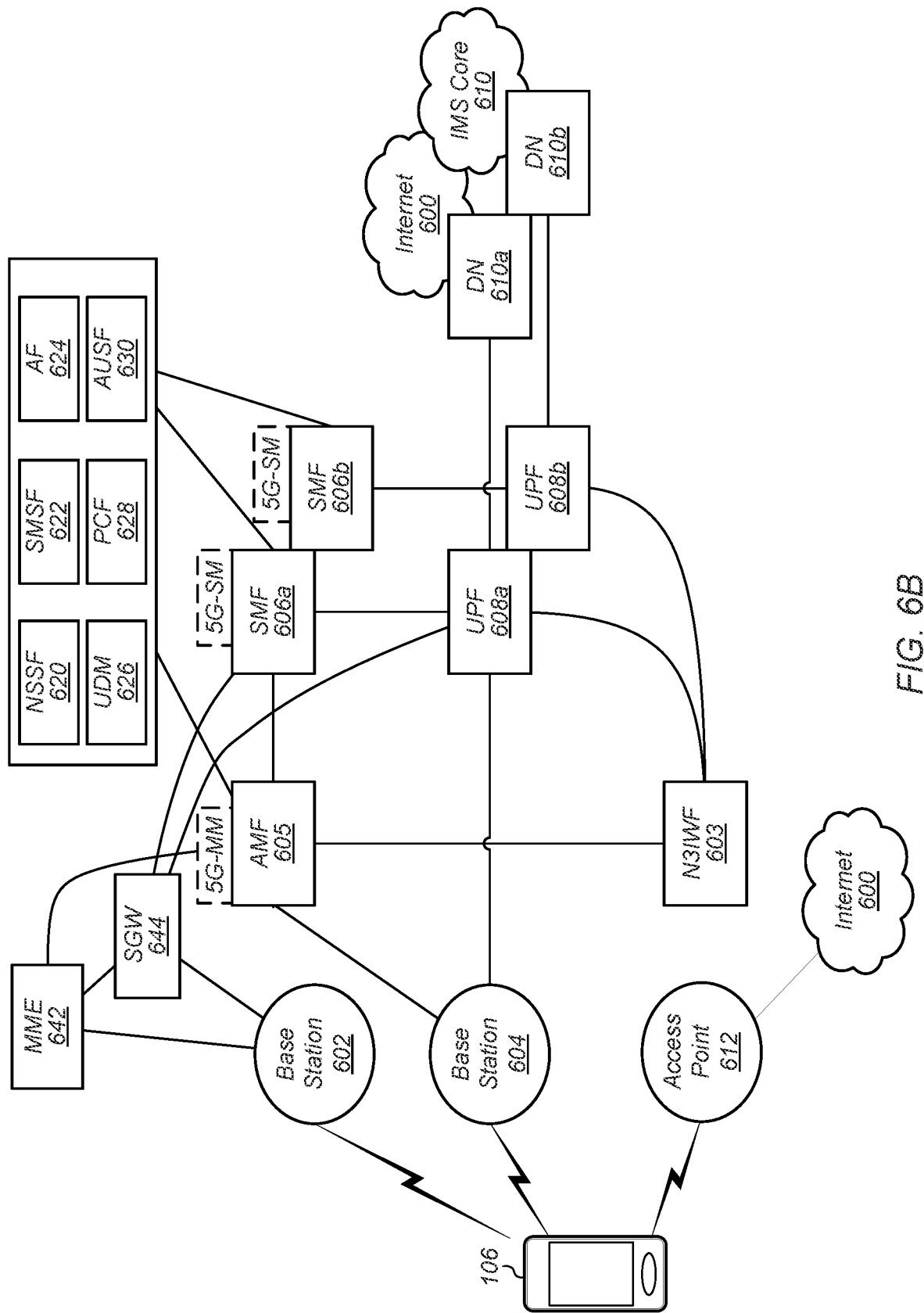
FIG. 6B illustrates an example of a 5G network architecture that incorporates both dual 3GPP (e.g., LTE and 5G NR) access and non-3GPP access to the 5G CN, according to some embodiments.
Figure 7:
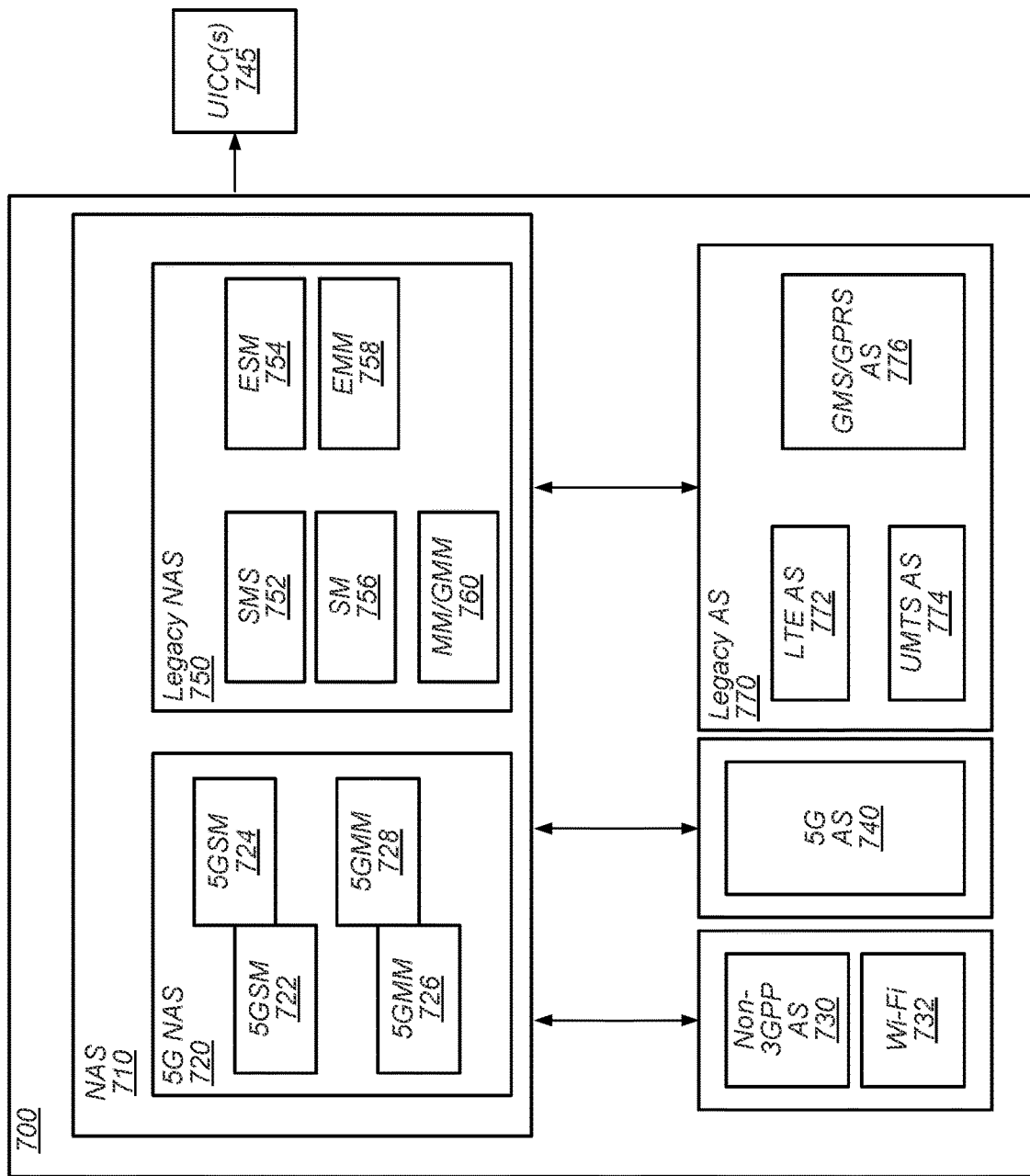
FIG. 7 illustrates an example of a baseband processor architecture for a UE, according to some embodiments.

FIGS. 6A, 6B and 7: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606*a* and an SMF 606*b* of the 5G CN. The AMF 605 may be connected to (or in communication with) the SMF 606*a*. Further, the gNB 604 may in communication with (or connected to) a user plane function (UPF) 608*a* that may also be communication with the SMF 606*a*. Similarly, the N3IWF 603 may be communicating with a UPF 608*b* that may also be communicating with the SMF 606*b*. Both UPFs may be communicating with the data network (e.g., DN 610*a* and 610*b*) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606*a* and the UPF 608*a*. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606*a* and the SMF 606*b* of the 5G CN. The AMF 606 may be connected to (or in communication with) the SMF 606*a*. Further, the gNB 604 may in communication with (or connected to) the UPF 608*a* that may also be communication with the SMF 606*a*. Similarly, the N3IWF 603 may be communicating with a UPF 608*b* that may also be communicating with the SMF 606*b*. Both UPFs may be communicating with the data network (e.g., DN 610*a* and 610*b*) and/or the Internet 600 and IMS core network 610.

Note that in various embodiments, one or more of the above described network entities may be configured to perform methods to improve security checks in a 5G NR network, including mechanisms enhancement of network slicing for a UE, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods enhancement of network slicing for a UE, e.g., in 5G NR systems and beyond, e.g., as further described herein.

Network Slicing Enhancements

New cellular communication techniques are continually under development, e.g., to increase coverage, to better serve the range of demands and use cases, and for a variety of other reasons. As new cellular communication technologies are developed and deployed, certain features may be included that are new or differ from previously developed and deployed cellular communication technologies.

For example, one approach to a cellular network architecture may include use of various network slices to provide various services to users of the cellular network. Such an approach may enable a cellular network operator to virtually adapt its network infrastructure to provide a set of applications and services to users in a flexible and efficient manner. Different network slices may be established to provide enhanced mobile broadband (eMBB), ultra-reliable low-latency communications (URLLC), and/or massive machine type communications (mMTC/mIoT), and different Public Land Mobile Networks (PLMNs) may have support for specific ones of these network slice types. In particular, standards, such as 3GPP TS 24.501, define certain standard network slices, such as eMBB (e.g., suitable for handling 5G enhanced Mobile Broadband), URLLC (e.g., suitable for handling ultra-reliable low latency communications), MIOT (e.g., suitable for handling massive Internet of Things services/communications), and V2X (e.g., suitable for handling vehicle to everything services), and a carrier (e.g., network operator) can define additional network slices.

More generally, different network slices may be associated with different data behavior, bandwidth requirements, and/or quality of service (QOS) requirements, among other possibilities. Additionally, and/or alternatively, a PLMN may service a plurality of different network slices associated with a single service type. In these scenarios, network slice identity management may be performed using network slice selection assistance information (NSSAI), where each NSSAI may include one or more single NSSAIs (S-NSSAIs). Each S-NSSAI may have a S-NSSAI value that includes a set of bits to identify a service type of the slice and/or to differentiate between multiple network slices with the same service type. In addition, each S-NSSAIs may support one or more Protocol Data Unit (PDU) sessions for a UE.

Figure 8:
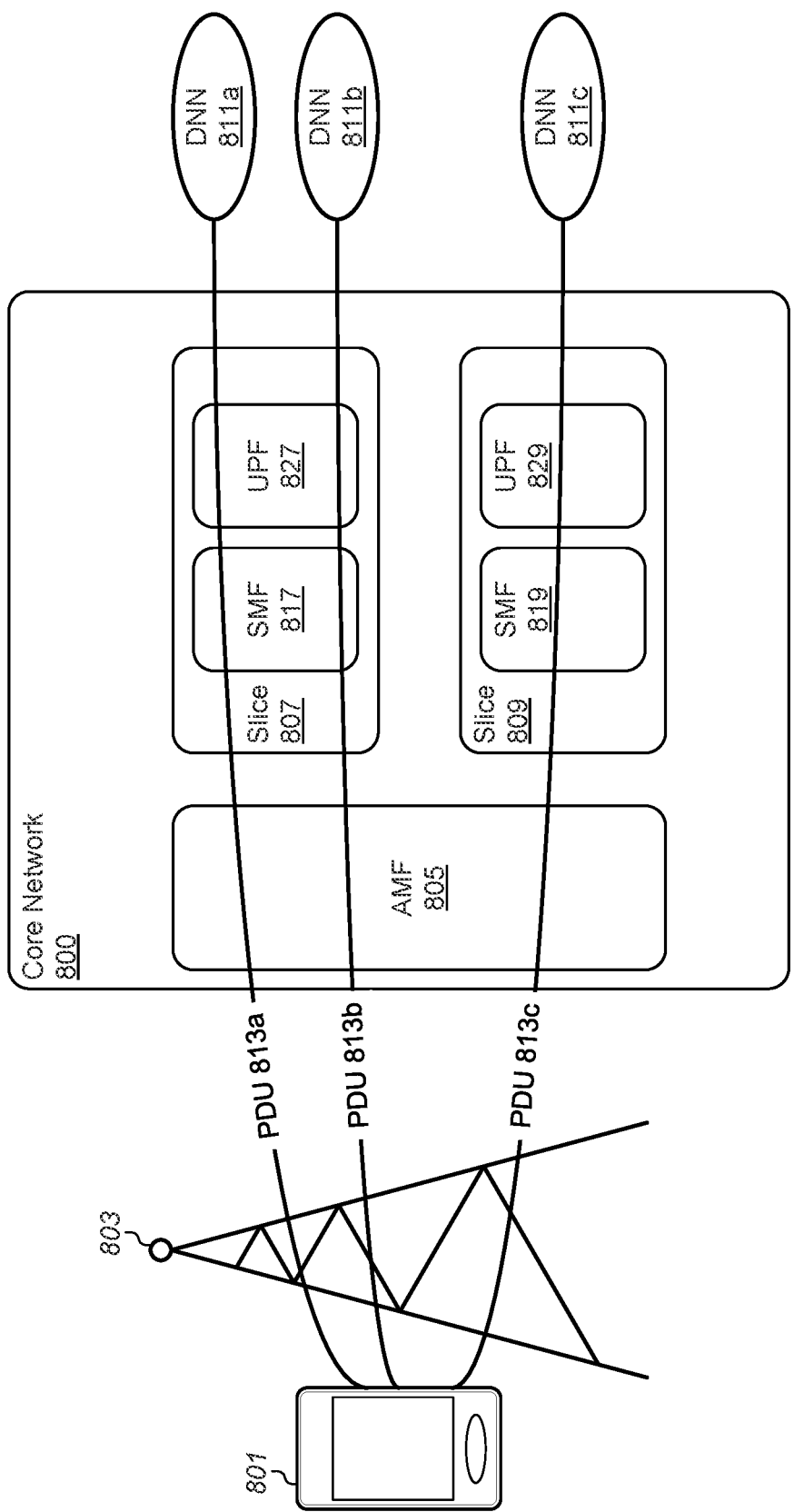
FIG. 8 illustrates an example of network slice data routing.

In current implementations, an operator of a network (e.g., carrier) can deploy network slices that differ for supported features and/or that provide exactly the same features, but for different groups of UEs. Thus, a single UE can be served by more than one network slice simultaneously (e.g., by network slices #1 and #2). In such cases, an AMF serving the single UE may be common to all network slices. As described above, a network slice is identified by an S-NSSAI (Single Network Slice Selection Assistance Information), which is comprised of a slice/service type (SST) and a slice differentiator (SD). A set of one or more S-NSSAIs is called the NSSAI (Network Slice Selection Assistance Information). Note further that multiple PDU sessions can share the same network slice. For example, as illustrated by FIG. 8, a UE 801 may maintain multiple PDU sessions 813a-c with data network name (DNN) servers 811a-c. The PDU sessions 813a-c may be supported by a base station 803 and AMF 805 of a core network 800. Additionally, as shown, a first network slice 807 of core network 800 may support PDU sessions 813a-b while a second network slice 809 may support PDU session 813c. In particular, SMF 817 and UPF 827 of network slice 807 may support PDU sessions 813a-b while SMF 819 and UPF 829 of network slice 809 may support PDU session 813c. In this manner, AMF 805 of core network 800 may support multiple network slices for UE 801.

In practice, a network sends a UE Route Selection Policy (URSP) rule to the UE and the UE uses the URSP to determine if a detected application can be associated to an established PDU Session, can be offloaded to non-3GPP access outside a PDU Session, or can trigger the establishment of a new PDU Session. The URSP rule includes one traffic descriptor that specifies matching criteria and one or more route selection descriptors which define parameters (including S-NSSAI) of the PDU session to be used to transfer the traffic. The traffic descriptor contains one or more of application identifiers (e.g., application ID), Internet Protocol (IP) 3 tuples, non-IP descriptors, data network names (DNNs), connection capabilities, and/or domain descriptors (e.g., destination fully qualified domain names (FQDN(s)). The route selection descriptor contains multiple elements, such as PDU session type, SSC mode, S-NSSAIs and DNNs.

There are multiple concerns related to using application ID (e.g., operating system (OS) Id+OS APP ID) as part of a traffic descriptor. For example, using APP ID may add high overhead due to the required alignment between APP developer and operator(s). Additionally, using APP ID may cause some user privacy issues as networks will be able to know which applications run on the UE side including when an application was launched, how long the application ran, how much data was transferred between the application and network, as so forth.

Further, network slices are defined based on DNN, IP/Port, FQDN, and APP ID, all useful for a network, but not necessarily for a UE. For example, DNN based slices are useful for vertical industries like IoT, V2X, and so forth since DNNs are mapped to network slices, however, a UE uses a single DDN for all applications. As another example, IP/Port based network slice deployments are unlikely as content is provided from multiple CDN's. Thus, IP/Port changes frequently for the same content on the Internet. Hence, IP/Port network slices are only useful for very specific carrier provided applications like VONR or MMS.

Further, there is no proper definition of APP ID in standards (e.g., APP IDs have not been defined in standards, such as those promulgated by 3GPP). In addition, user privacy is a major concern if application data based on APP ID or FQDN is mapped to a network slice by a UE (e.g., this type of network slice reveals when a user opened an application and how long he used that application to an operator). Additionally, UEs may require dynamic slice configuration based on application needs, which also is not defined by standards (e.g., 3GPP Releases 15 and 16 do not provide possibility to have network slice for UEs).

Figure 9A:
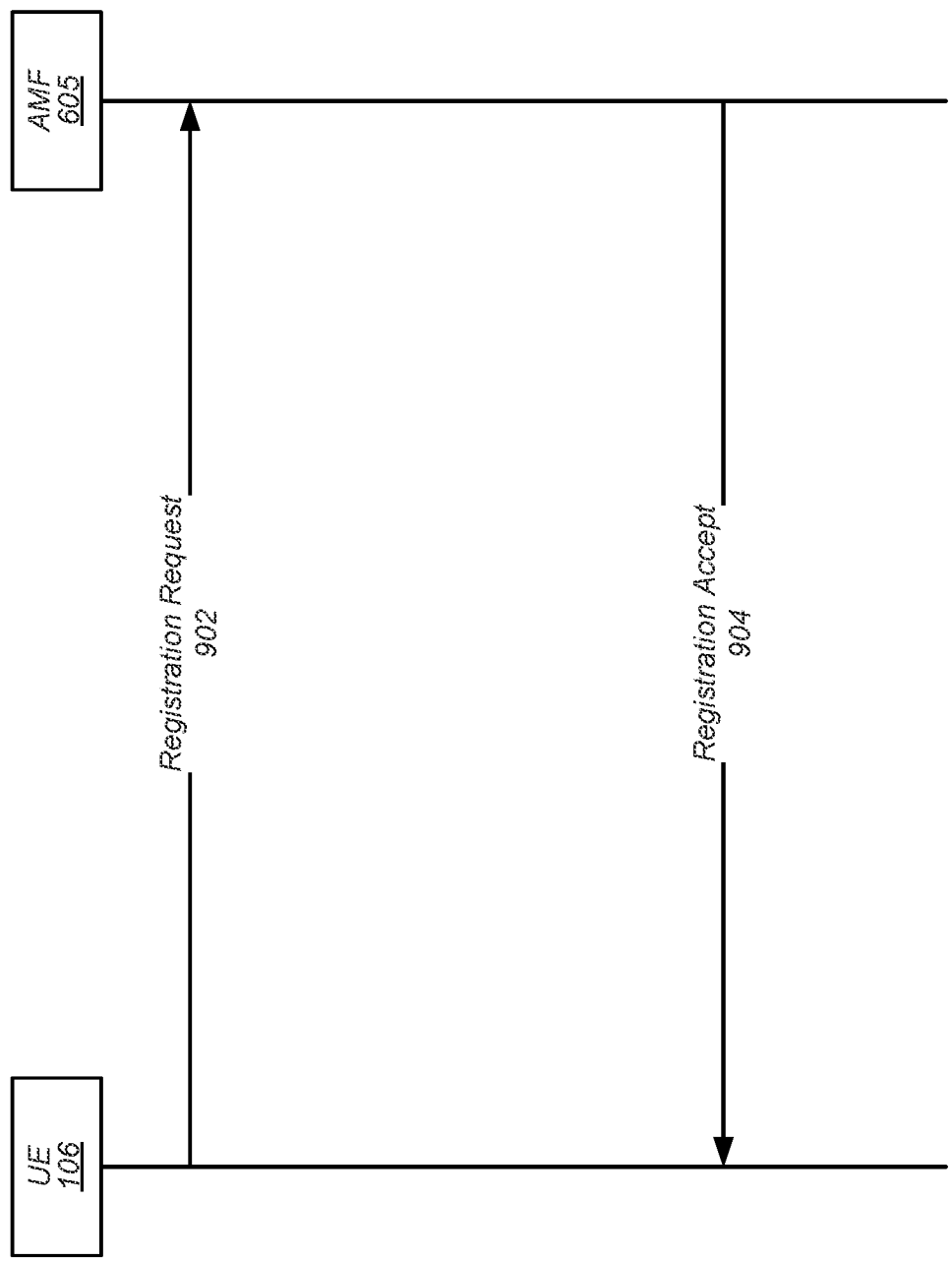
FIG. 9A illustrates an example of signaling for indicating supported traffic descriptors to a network, according to some embodiments.

Embodiments described herein provide systems, method, and mechanisms for enhancement of network slicing for a UE, e.g., in 5G NR systems and beyond. In some embodiments, a UE, such as UE 106, may have an opportunity to indicate supported traffic descriptors to a network for URSP purposes, e.g., as illustrated by FIG. 9A. In some embodiments, such a capability may allow the UE to indicate whether the UE supports APP ID for network slice assignment. In some embodiments, a network may notify a UE (e.g., via a registration accept message) whether the UE will need to enforce network slice traffic descriptors.

Turning to FIG. 9A, illustrated is an example of signaling for indicating supported traffic descriptors to a network, according to some embodiments. The signaling shown in FIG. 9A may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a UE, such as UE 106, may send a registration request message 902 to an AMF, such AMF 605, of a core network. The registration request message 902 may include a UE network slice capability, e.g., whether the UE supports providing network slice descriptors such as APP ID, DNN, IP/Port information, and so forth to the network. For example, the UE 106 may use the registration request message 902 to indicate whether the UE 106 supports (and/or intends to support) APP ID type. In other words, via registration request message 902, the UE 106 may indicate that it does not intend (or want) to support APP ID type, e.g., due to user privacy concerns. Additionally, the UE 106 may indicate supported traffic descriptors for URSP purposes via registration request message 902.

In some embodiments, the registration request message 902, e.g., as illustrated in FIG. 9B, may include a network slice capability information element (IE). As shown in FIG. 9B, the network slice capability IE may be an optional IE with a variable format and a length of 1 octet. Further, as shown in FIG. 9C, the network slice capability IE may include enumerated values comprising a list of various parameters/descriptors the UE intends to support/not support that are associated with a network slice. In other words, the UE may send a list of parameters/network slice descriptors the UE intends to support/not support and not values associated with the parameters/network slice descriptors For example, a network slice capability IE may include indications for support and/or non-support of any, any combination of, and/or all of (e.g., at least one of and/or one or more of) an application ID (APP ID) and operating system ID (OS ID) (APP ID+OS ID), an IPV4 remote address, an IPV6 remote address, a protocol identifier and/or next header type parameter, a remote port, a security parameter index type, a type of service and/or traffic class type, a flow label type, an FQDN, a DNN, an APP ID, and/or connection capabilities, among other parameters associated with network slicing. In other words, the UE 106 may include supported and/or non-supported network slice descriptors (and not values associated with the network slice descriptors) in the network slice capability IE. For example, if the UE does not intend to support APP ID as a network slice descriptor, the UE may send a network slice capability IE that does not include APP ID descriptor in a list of supported network slice descriptors. In such an instance, the network can then interpret the network slice capability IE to determine that the UE is not supporting APP ID as a network slice descriptor (e.g., based on the exclusion of the APP ID descriptor from the list). As another example, if the UE does not intend to support APP ID as a network slice descriptor, the UE may send a network slice capability ID that includes the APP ID descriptor in a list of unsupported network slice descriptors. In such an instance, the network can then interpret the network slice capability IE to determine that the UE is not supporting APP ID as a network slice descriptor, e.g., based on inclusion of the APP ID descriptor in the list).

In response to the registration request message 902, the AMF 605 may send a registration accept message 904 to the UE 106. In some embodiments, the AMF 605 may indicate to UE 106 whether the UE 106 will need to enforce network slice traffic descriptors. In some embodiments, an operating system (OS) of the UE 106 may have access to a FQDN from an application only if (and/or when) the application uses a networking framework of the OS. Thus, if and/or when a network device is configured with an FQDN traffic descriptor, the OS may support the FQDN traffic descriptor only for applications that are using the networking framework of the OS. In other words, for applications using the networking framework of the OS, the OS may enforce network connection mapping to a particular network slice. Alternatively, the OS may expose network slice configurations from a carrier to applications via platform service provider interfaces (SPIs) and/or application programming interfaces (APIs). In such instances, the applications may be required to look into the network slice configuration and select the correct network slice configuration based on the application requirements (e.g., per current standards rules). Further, in such instances, the OS will not be able to enforce network slice mapping.

Figure 10:
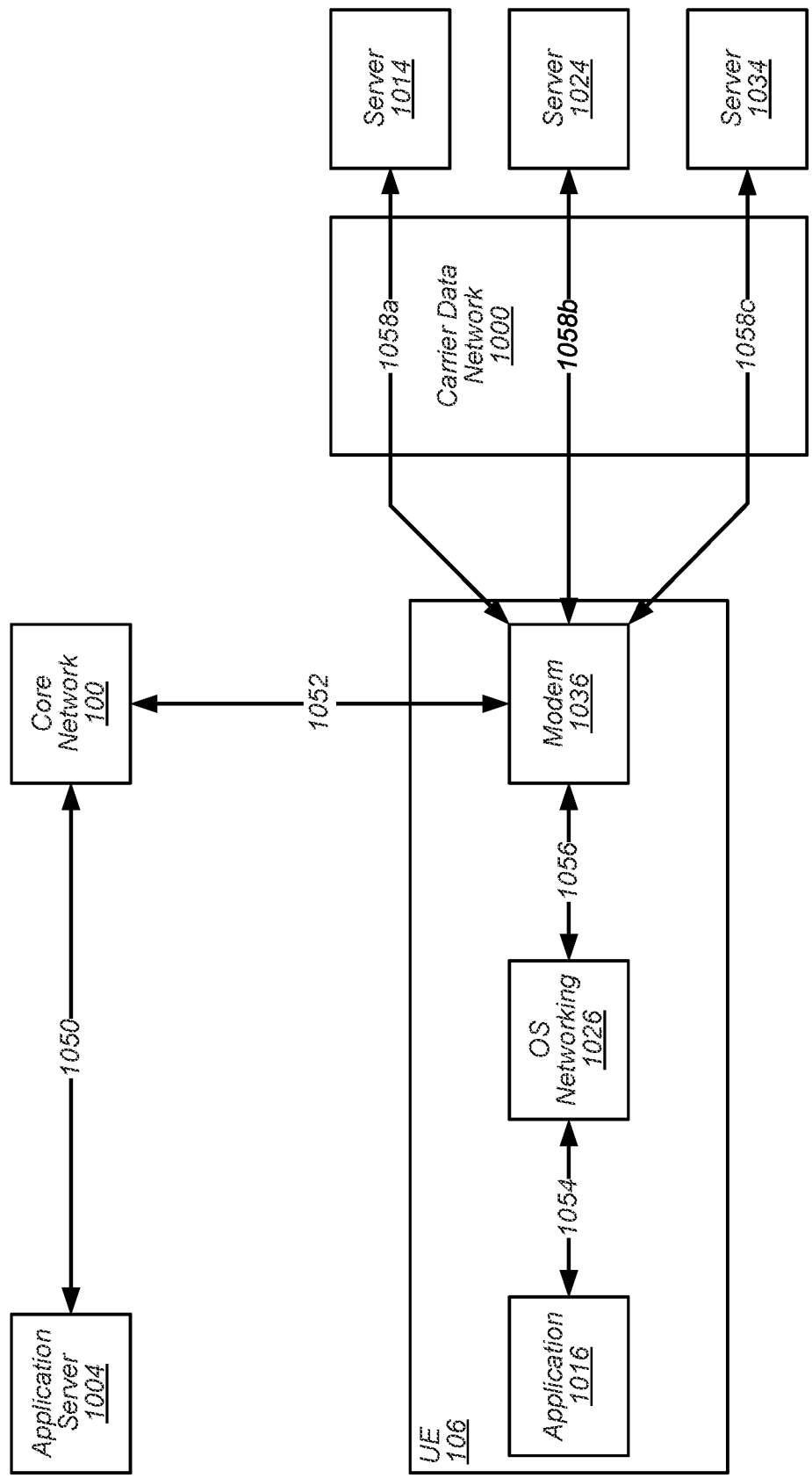
FIG. 10 illustrates an example of network slice data routing, according to some embodiments.

In some embodiments, e.g., as illustrated by FIG. 10, a network may provide an appropriate slice configuration/URSP to a UE, such as UE 106, based on information received from an application server. Note that the signaling shown in FIG. 10 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, an application developer and network may have an agreement (e.g., a contractual obligation between the application developer and network carrier for the network carrier to provide a network slice for an application of the network developer, usually at a cost to the network developer) for a network slice, e.g., stored on an application server, such as application server 1004, and the application server may supply application related information (e.g., APP ID, domain, required QoS, and network related attributes) to the network, e.g., to core network 100, via signaling 1050. In some embodiments, application related information may include traffic descriptors such as APP ID, FQDN, IP/Port, and so forth as well as routing information associated with the application and/or validity of a network slice in terms of location and time. Thus, in some embodiments, an interface from a network slice customer/application developer to a network slice provider/carrier may be added, e.g., may be defined by standards. In some embodiments, a parameter such as AllocateNssi API and/or ServiceParameterCreate may be modified and/or extended to include any, any combination of, and/or all of Application ID+OS ID, IPv4 Remote address, IPv6 Remote address, Protocol Identifier/next header type, remote port, remote port range, Security parameter index type, type of service and/or traffic class type, flow label type, FQDN, DNN, Application ID, and/or connection capabilities. For example, as further described below in reference to FIG. 11, such a parameter may be signaled between a network slice customer and a network slice provider.

Once the core network 100 receives the application related information from the application server 1004, the core network 100 may provide and/or supply the application related information to UE 106 via signaling 1052. In some embodiments, signaling 1052 may include signaling as described in reference to FIGS. 9A-C and/or as described in reference to FIGS. 12A-B.

Then, at some later point in time (e.g., after the UE has received URSP information), an application 1016 may launch on UE 106. The application 1016 may exchange data messages 1054 with an OS networking platform 1026 of UE 106. OS networking platform 1026 may then exchange data messages 1056 with modem 1036. Then, based on application related information supplied to modem 1036 by core network 100, the modem 1036 may initiate one or more PDU sessions supported by one or more network slices 1058a-c over carrier data network 1000. In other words, modem 1036 may route traffic according to URSP based on application connection information to one or more of DNNs (e.g., servers 1014, 1024, and 1034) via carrier data network 1000. In this manner, applications may take advantage of dedicated QoS (e.g., as supported by a particular network slice associated with the application). However, carrier data network 1000 may be able to harvest user behavior.

Carrier data network 1000 being able to harvest user behavior may create a privacy concern, at least for certain users. For example, as described above, an application developer and network may have an agreement for a network slice and the application developer may send application related information (e.g., APP ID, domain, required QoS, and/or network related attributes) to the core network. In turn, the core network may send (via the URSP) this information to all devices under their service. Then, when a user opens the application developer's application, the OS of the UE may map the application connection information to the network slice according to the URSP. Thus, whenever there is some data on that network slice, the carrier data network will be aware that the user is actively interacting with that particular application. Further, there can be a scenario where an application developer may want to use a network slice only for premium users, where a subscription for the network slice is paid by the application developer to the carrier. However, since an OS may not be aware of premium versus free users of that application, all data from that application may be mapped to the network slice and this may cause bill shock to application developer.

Thus, in some embodiments, upon application 1016 opening, the application 1016 may set a Boolean flag to indicate to OS networking platform 1026 whether or not to use a network slice. Thus, when the Boolean flag is set, OS networking platform 1026 and/or modem 1036 may route traffic from application 1016 over a particular network slice, e.g., based on the URSP routing. In such instances, user behavior related to application 1016 may be harvested by carrier data network 1000. However, when the Boolean flag is not set, OS networking platform 1026 and/or modem 1036 may route traffic from application 1016 over a default network slice, thereby not allowing user behavior associated with application 1016 to be harvested by carrier data network 1000. Alternatively, and/or in addition, a user of UE 106 may determine whether or not to use a network slice associated with an application. For example, via a user interface (UI) setting, the UE may expose whether a particular application, such as application 1016, is associated with a network slice. In such instances, the UE may be able of select whether to use the network slice for application 1016 (thereby allowing carrier data network 1000 to harvest user behavior associated with application 1016) or whether to use a default network slice for application (thereby not allowing carrier data network 1000 to harvest user behavior associated with application 1016).

Further, in some embodiments, when an application developer only wants to use a network slice for premium (e.g., paying) users, the application developer may collect a SUCI (Subscription Concealed Identifier) from a UE, e.g., at time of purchase and/or at time of subscription of an application, and provide the SUCI to the core network. Then, the core network may only send URSP for the application to UEs associated with SUCIs received from the application developer.

In some embodiments, a bundle ID may be used in place of an APP ID. In some embodiments, to accommodate usage of a bundle ID, APP ID may be changed from a one octet parameter to a variable length string, e.g., in standards, such as 3GPP TS 24.526. Alternatively, an application developer interested in network slicing may generate a unique numerical APP ID from an application store. In such instances, the application store may maintain a mapping between a bundle ID and the numerical APP ID.

Figure 11:
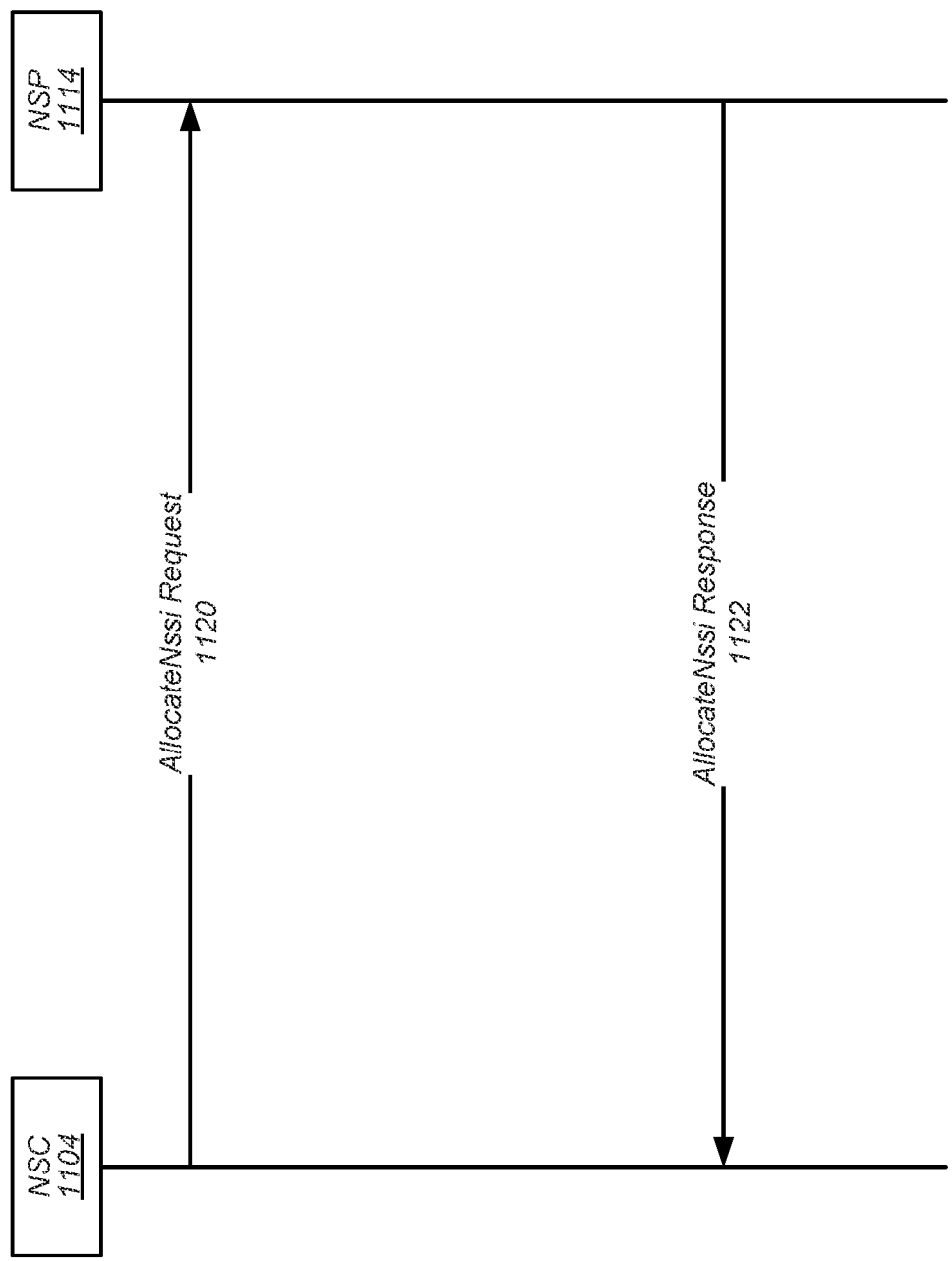
FIG. 11 illustrates an example of signaling between a network slice customer and a network slice provider, according to some embodiments.

FIG. 11 illustrates an example of signaling between a network slice customer and a network slice provider, according to some embodiments. The signaling shown in FIG. 11 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

A network slice customer (e.g., application developer/server), such as NSC 1104, may transmit an AllocateNssi request message 1120 to a network slice provider (e.g., carrier data network), such as NSP 1114. The AllocateNssi request message may include a modified and/or extended parameter such as AllocateNssi API and/or ServiceParameterCreate that may include fields defining information associated with a network slice for NSC 1104, e.g., as described above. Thus, the AllocateNssi request message 1120 may include any combination of, and/or all of Application ID+OS ID, IPv4 Remote address, IPV6 Remote address, Protocol Identifier/next header type, remote port, remote port range, Security parameter index type, type of service and/or traffic class type, flow label type, FQDN, DNN, Application ID, and/or connection capabilities.

NSP 1114 may send an AllocateNssi response message 1122 to NSC 1104 that may indicate an HTTP status. The HTTP status may include an accepted attribute list, a status indicator, and/or an nSS ID.

The network (core network 100) may send the application related information to all UEs/devices (e.g., all UEs 106) in the network (e.g., via a URSP). Thus, as shown, core network 100 may perform signaling with a modem 1036 of UE 106, e.g., to provide application related information for network slices to the UE. In some embodiments, for each application, the network may need to provide an APP ID and associated routing information for multiple OSs. Such a requirement increases size of the URSP and may create an extreme amount of overhead for a network. Thus, in some embodiments, the UE, e.g., such as UE 106, may include its OS-ID in a registration request message, e.g., such as registration request message 902 described herein. Additionally, the UE may also include an OS version in the registration request message.

In some embodiments, an application traffic category may be used to determine a network slice. In other words, the application traffic category may be used as a traffic descriptor, e.g., instead of an application (APP) ID. In some embodiments, the UE (e.g., an operating system of the UE) may check an application traffic category of an application when the application requests to open a network connection and map the connection to a network slice based on the application category provisioned by the network. In some embodiments, if there no mapping available, the UE may use a default network slice.

Figure 12A:
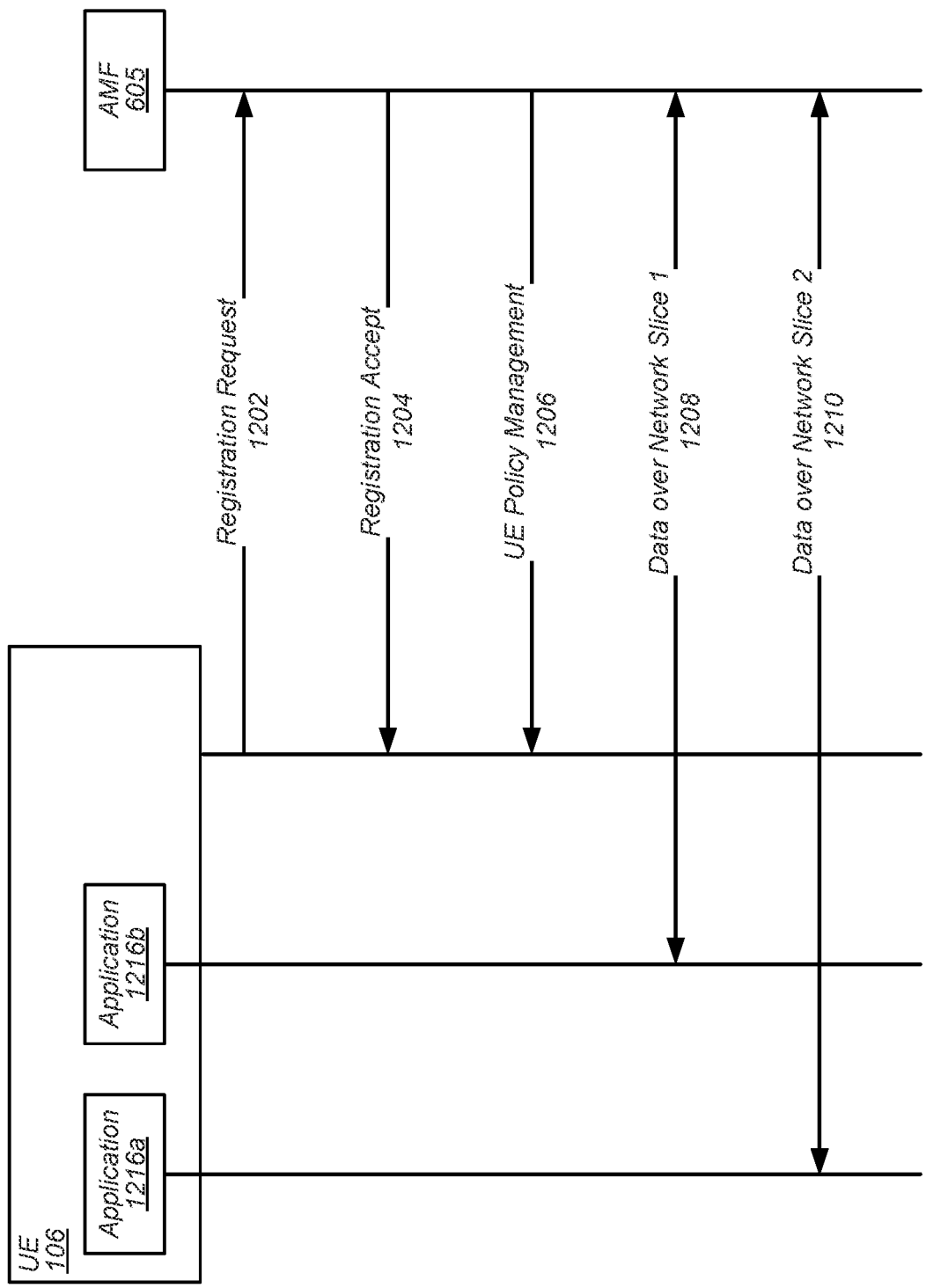
FIG. 12A illustrates an example of signaling for using an application traffic category to determine a network slice, according to some embodiments.

For example, FIG. 12A illustrates an example of signaling for using an application traffic category to determine a network slice, according to some embodiments. The signaling shown in FIG. 12A may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a UE, such as UE 106, may send a registration request message 1202 to an AMF, such AMF 605, of a core network. The registration request message 1202 may be similar to registration request message 902 and may include UE network slice capability, APP ID, DNN, IP/Port information, and so forth. The UE 106 may use the registration request message 1202 to indicate whether the UE 106 supports (and/or intends to support) APP ID type. In other words, via registration request message 1202, the UE 106 may indicate that it does not intend (or want) to support APP ID type, e.g., due to user privacy concerns. Additionally, the UE 106 may indicate supported traffic descriptors for URSP purposes via registration request message 1202. In some embodiments, the registration request message 1202 may include a network slice capability information element (IE) as described above in reference to FIGS. 9B and 9C.

In response to the registration request message 1202, the AMF 605 may send a registration accept message 1204 to the UE 106. In some embodiments, the AMF 605 may indicate to UE 106 whether the UE 106 will need to enforce network slice traffic descriptors. In some embodiments, an operating system (OS) of the UE 106 may have access to a FQDN from an application only if (and/or when) the application uses a networking framework of the OS. Thus, if and/or when a network device is configured with an FQDN traffic descriptor, the OS may support the FQDN traffic descriptor only for applications that are using the networking framework of the OS. In other words, for applications using the networking framework of the OS, the OS may enforce network connection mapping to a particular network slice. Alternatively, the OS may expose network slice configurations from a carrier to applications via platform service provider interfaces (SPIs) and/or application programming interfaces (APIs). In such instances, the applications may be required to look into the network slice configuration and select the correct network slice configuration based on the application requirements (e.g., per current standards rules). Further, in such instances, the OS will not be able to enforce network slice mapping.

Further, the AMF 605 may send a mange UE policy message 1206 to UE 106. The manage UE policy message 1206 may include an application traffic category to network slice ID mapping, e.g., as illustrated by FIG. 12B. As shown in FIG. 12B, the application traffic categories may be mapped to particular network slice IDs.

Then, when various applications (e.g., applications 1216a-b) launch on UE 106, data traffic from particular applications may be routed to particular network slices, e.g., based on an application traffic category associated with each application. Thus, as shown, application 1216a may include an application traffic category such that data 1208 is sent via network slice 1 whereas application 1216b may include an application traffic category such that data 1210 is sent via network slice 2.

In some embodiments, a UE may support both an application ID (APP ID) and an application traffic category. In such embodiments, an APP ID information element may be modified to include a Boolean flag to indicate whether the application ID or the application traffic category is being used by the network. In some embodiments, the Boolean flag may be application specific. In some embodiments, the Boolean flag may apply to an URSP.

Figure 13:
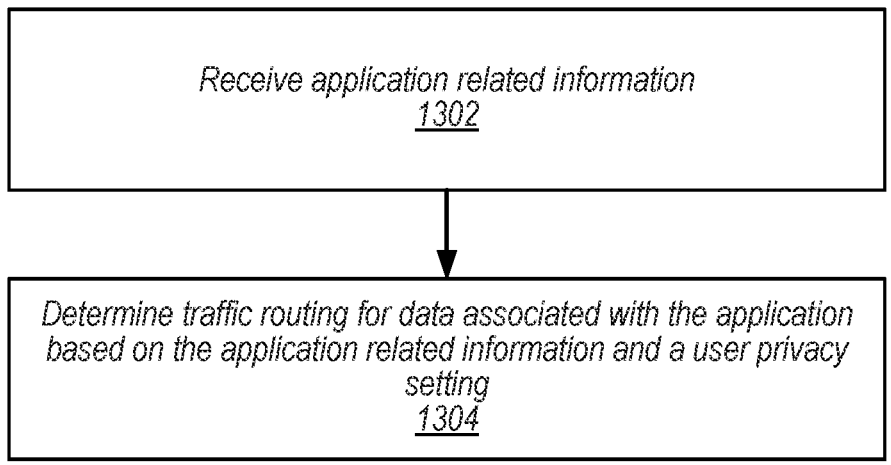
FIG. 13 illustrates a block diagram of an example of a method for determining a network slice for data associated with an application based on a user privacy setting, according to some embodiments.

FIG. 13 illustrates a block diagram of an example of a method for determining a network slice for data associated with an application based on a user privacy setting, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may receive, from an AMF, such as AMF 605, of a network, such as network 100, application related information. The application related information may be associated with network slice data routing, e.g., for data associated with an application that can be executed on the UE. In some embodiments, the application related information may include a bundle identifier (ID). The bundle identifier may indicate an application identifier (APP ID). In some embodiments, the application related information may include a UE Route Selection Policy (URSP) table. The URSP table may include an application (APP) identifier (ID). The APP ID may be a first type of APP ID or a second type of APP ID. The first type of APP ID may identify a unique application in an application store associated with an operating system (OS) of the UE. The second type of APP ID may identify an application network connection category level. In some embodiments, the URSP table may include a Boolean flag for each APP ID included in the URSP table and the Boolean flag may indicate whether an APP ID is the first type of APP ID or the second type of APP ID. In some embodiments, the URSP table may include a Boolean flag and the Boolean flag indicates whether APP IDs included in the URSP table are the first type of APP ID or the second type of APP ID.

In some embodiments, to receive, from the AMF of the network, the application related information, the UE may transmit, to the AMF, a registration request message and receive, from the AMF, the application related information. The registration request message may include an indication of a network slice capability associated with the UE. The network slice capability may indicate that the UE does not support application identifier (APP ID) as a network slice descriptor. The network slice capability may be indicated via a network slice capability information element. The network slice capability information element may include a list of network slice descriptors the UE intends to support and/or a list of network slice descriptors the UE does not intend to support. The list of network slice descriptors may include any, any combination of, and/or all of (e.g., at least one of and/or one or more of) an application ID (APP ID) and operating system ID (OS ID) (APP ID+OS ID) descriptor, an IPV4 remote address descriptor, an IPV6 remote address descriptor, a protocol identifier and/or next header type parameter descriptor, a remote port descriptor, a security parameter index type descriptor, a type of service and/or traffic class type descriptor, a flow label type descriptor, an FQDN descriptor, a DNN descriptor, an APP ID descriptor, and/or connection capabilities descriptor, among other descriptors associated with network slicing. Note that the UE does not send actual values for the descriptors, only a list of which descriptors are supported/not supported.

In some embodiments, to receive, from the AMF of the network, the application related information, the UE may receive application related information based on a Subscription Concealed Identifier (SUCI), e.g., that the UE provided to an application developer of the application. In some embodiments, to receive, from the AMF of the network, application related information, the UE may receive, from the AMF of the network, a policy message. The policy message may include an application category to network slice identifier (ID) mapping. In such embodiments, the determination of the traffic routing for data associated with the application is further based, at least in part, on the mapping.

In some embodiments, the UE may provide, prior to receiving the application related information, an operating system (OS) identifier (ID) to the network. The application related information may then be based on the OS-ID. In some embodiments, the UE may also provide an OS version to the network. In such embodiments, the application related information may then be based on the OS-ID and the OS version.

At 1304, the UE (e.g., a processor of the UE, such as a processor of a modem of the UE and/or a baseband processor of the UE) may, in response to initiation of an application, determine traffic routing for data associated with the application. The traffic routing may be based, at least in part, on the application related information and/or a user privacy setting associated with the application. In some embodiments, the user privacy setting associated with the application may be and/or be considered a UE configuration associate with user privacy. Thus, the traffic routing may be based, at least in part, on the application related information and/or a UE configuration associated with user privacy. In some embodiments, when the user privacy setting is enabled (and/or when the UE configuration associated with user privacy is set to not use network slice routing for the application), the data may be routed via a default network slice. In some embodiments, when the user privacy setting is disabled (and/or when the UE configuration associated with user privacy is set to use network slice routing for the application), the data may be routed via a network slice indicated by the application related information. The user privacy setting (and/or UE configuration associated with user privacy) may be indicated by the application via a Boolean flag and/or via a user interface setting. In some embodiments, an operating system (OS) network platform may receive the Boolean flag and/or user interface setting from the application and/or OS and pass the Boolean flag and/or user interface to the baseband processor of the UE.

Figure 14:
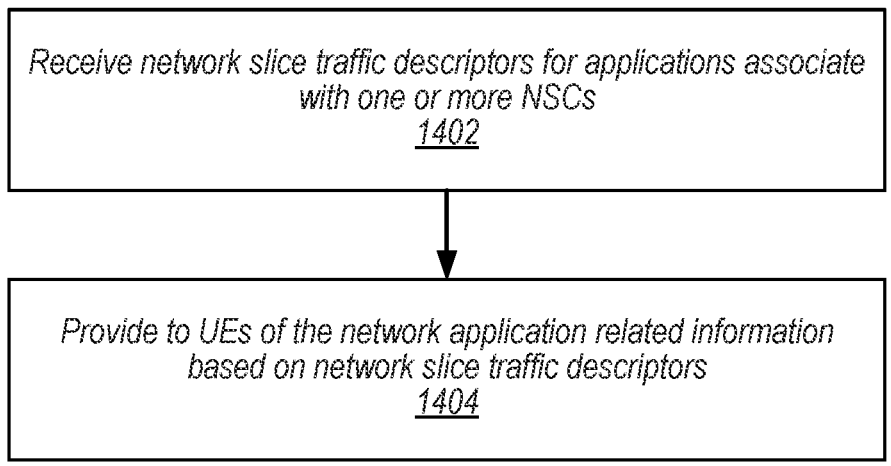
FIG. 14 illustrates a block diagram of an example of a method for a network to receive network slice traffic descriptors form application developers, according to some embodiments.

FIG. 14 illustrates a block diagram of an example of a method for a network to receive network slice traffic descriptors form application developers, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a network entity of a network, e.g., such as AMF 605, may receive, from one or more network slice customers (NSCs) (e.g., application developers), network slice traffic descriptors for applications associated with each NSC of the one or more NSCs. For each application, the network slice traffic descriptors may include any combination of, and/or all of Application ID+OS ID, IPv4 Remote address, IPv6 Remote address, Protocol Identifier/next header type, remote port, remote port range, Security parameter index type, type of service and/or traffic class type, flow label type, FQDN, DNN, Application ID, and/or connection capabilities In some embodiments, the network slice traffic descriptors may be included in an AllocateNssi request message. In some embodiments, the network slice traffic descriptors may be included in a AllocateNssi API parameter and/or a ServiceParameterCreate parameter included in a request message.

At 1404, the network entity may provide to UEs, such as UEs 106, serviced by the network application related information associated with network slice data routing. The application related information may be based, at least in part, on the network slice traffic descriptors received from the one or more NSCs. For each application, the application related information may include any combination of, and/or all of Application ID+OS ID, IPv4 Remote address, IPv6 Remote address, Protocol Identifier/next header type, remote port, remote port range, Security parameter index type, type of service and/or traffic class type, flow label type, FQDN, DNN, Application ID, and/or connection capabilities.

In some embodiments, prior to providing the application related information, the network entity may receive an operating system (OS) identifier (ID) from a UE. In such embodiments, the application related information may be based on the OS-ID. In some embodiments, prior to providing the application related information, the network entity may receive an OS-ID and an OS version from a UE. In such embodiments, the application related information may be based on the OS-ID and OS version.

In some embodiments, the network entity may receive, from an NSC of the one or more NSCs, application related information based on one or more Subscription Concealed Identifiers (SUCIs) provided to the NSC. In such embodiments, the application related information may be based on the one or more SUCIs.

In some embodiments, the application related information may include a UE Route Selection Policy (URSP) table. The URSP table may include an application (APP) identifier (ID). The APP ID may be a first type of APP ID or a second type of APP ID. The first type of APP ID may identify a unique application in an application store associated with an operating system (OS) of the UE. The second type of APP ID may identify an application network connection category level. In some embodiments, the URSP table may include a Boolean flag for each APP ID included in the URSP table and the Boolean flag may indicate whether an APP ID is the first type of APP ID or the second type of APP ID. In some embodiments, the URSP table may include a Boolean flag and the Boolean flag indicates whether APP IDs included in the URSP table are the first type of APP ID or the second type of APP ID.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An access and mobility management function (AMF) of a core network, comprising:
    at least one network interface; and
    one or more processors coupled to the at least one network interface;
    wherein the one or more processors are configured to cause the AMF of the core network to:
        receive, from one or more network slice customers (NSCs), traffic descriptors for applications and associated routing information associated with each NSC of the one or more NSCs; and
        provide, for one or more user equipment devices (UEs) serviced by a network associated with the AMF of the core network, application related information associated with network slice data routing, wherein the application related information includes a UE Route Selection Policy (URSP) and is based, at least in part, on the traffic descriptors and associated routing information received from the one or more NSCs.

2. The AMF of the core network of claim 1,
    wherein, for each application, the network slice traffic descriptors include at least one of:
        an application identifier (APP ID) and operating system ID (OS ID) (APP ID+OS ID);
        an Internet Protocol (IP) version 4 (IPv4) remote address;
        an IP version 6 (IPv6) remote address;
        a protocol identifier or next header type parameter;
        a remote port;
        a security parameter index type;
        a type of service and/or traffic class type;
        a flow label type;
        a Fully Qualified Domain Name (FQDN),
        a data network name (DNN);
        an APP ID; or
        connection capabilities; and
    wherein, for each application, the application related information includes at least one of:
        an APP ID+OS ID;
        an IPv4 remote address;
        an IPv6 remote address;
        a protocol identifier or next header type parameter;
        a remote port;
        a security parameter index type;
        a type of service and/or traffic class type;
        a flow label type;
        an FQDN;
        a DNN;
        an APP ID; or
        connection capabilities.

3. The AMF of the core network of claim 1,
    wherein the traffic descriptors are included in a AllocateNssi API parameter or a ServiceParameterCreate parameter included in an AllocateNssi request message.

4. The AMF of the core network of claim 1,
    wherein the one or more processors are further configured to cause the AMF of the core network to:
        receive, prior to providing the application related information, an operating system (OS) identifier (ID) from a UE; and
        wherein, to provide the application related information to the UE, the one or more processors are further configured to cause the AMF of the core network to provide the application related information based on the OS-ID.

5. The AMF of the core network of claim 4,
    wherein the one or more processors are further configured to cause the AMF of the core network to:
        receive, prior to providing the application related information, an OS version from the UE; and
        wherein, to provide the application related information to the UE, the one or more processors are further configured to cause the AMF of the core network to provide the application related information based on the OS-ID and the OS version.

6. The AMF of the core network of claim 1,
    wherein the one or more processors are further configured to cause the AMF of the core network to:
        receive, from an NSC of the one or more NSCs, application related information based on one or more Subscription Concealed Identifiers (SUCIs) provided to the NSC; and
    wherein, to provide the application related information to the UEs, the one or more processors are further configured to cause the AMF of the core network to provide the application related information based on the one or more SUCIs.

7. The AMF of the core network of claim 1,
    wherein the URSP comprises a URSP table, wherein the URSP table includes an application (APP) identifier (ID), wherein the APP ID is a first type of APP ID or a second type of APP ID, wherein the first type of APP ID identifies a unique application in an application store associated with an operating system (OS) of the UE, wherein the second type of APP ID identifies an application network connection category level, and wherein the URSP table includes at least one of:
        a Boolean flag indicating whether APP IDs included in the URSP table are the first type of APP ID or the second type of APP ID; or a Boolean flag for each APP ID included in the URSP table, wherein the Boolean flag indicates whether an APP ID is the first type of APP ID or the second type of APP ID.

8. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors are configured to cause the UE to:
receive, from a core access and mobility management function (AMF) of a network, application related information, wherein the application related information is associated with network slice data routing; and
in response to initiation of an application, determine traffic routing for data associated with the application based, at least in part, on the application related information and a user privacy setting associated with the application, wherein, when the user privacy setting is enabled, the data is routed via a default network slice.

9. The UE of claim 8,
wherein, when the user privacy setting is disabled, the data is routed via a network slice indicated by the application related information.

10. The UE of claim 8,
wherein the user privacy setting is indicated by the application via a Boolean flag, and wherein the user privacy setting is indicated to the application via user interface setting.

11. The UE of claim 8,
wherein, to receive, from the AMF of the network, the application related information, the one or more processors are configured to cause the UE to:
transmit, to the AMF, a registration request message, wherein the registration request message includes an indication of network slice capability, wherein the network slice capability indicates that the UE does not support application identifier (APP ID) as a network slice descriptor, and wherein the network slice capability is indicated via a network slice capability information element that includes a list of network slice descriptors that the UE intends to support.

12. The UE of claim 8,
wherein, to receive, from the AMF of the network, the application related information, the one or more processors are configured to cause the UE to perform at least one of:
receiving the application related information based on a Subscription Concealed Identifier (SUCI) provided to an application developer of the application; or
receiving, from the AMF of the network, a policy message, wherein the policy message includes an application category to network slice identifier (ID) mapping, and wherein the determination of the traffic routing for data associated with the application is further based, at least in part, on the mapping.

13. The UE of claim 8,
wherein the one or more processors are configured to cause the UE to:
provide, prior to receiving the application related information, at least one of:
an operating system (OS) identifier (ID) to the network, wherein the application related information is based on the OS-ID; or
an OS version to the network, wherein the application related information is further based on the OS version.

14. The UE of claim 8,
wherein the application related information includes a bundle identifier (ID), and wherein the bundle identifier indicates an application identifier (APP ID).

15. The UE of claim 8,
wherein the application related information includes a UE Route Selection Policy (URSP) table, wherein the URSP table includes an application (APP) identifier (ID), and wherein the APP ID is a first type of APP ID or a second type of APP ID, wherein the first type of APP ID identifies a unique application in an application store associated with an operating system (OS) of the UE, wherein the second type of APP ID identifies an application network connection category level, and wherein the URSP table includes at least one of:
a Boolean flag indicating whether APP IDs included in the URSP table are the first type of APP ID or the second type of APP ID; or
a Boolean flag for each APP ID included in the URSP table, wherein the Boolean flag indicates whether an APP ID is the first type of APP ID or the second type of APP ID.

16. An apparatus, comprising:
a memory; and
one or more processors in communication with the memory, wherein the one or more processors are configured to:
receive, from a core access and mobility management function (AMF) of a network, application related information, wherein the application related information is associated with network slice data routing; and
in response to initiation of an application on a user equipment device (UE), determine traffic routing for data associated with the application based, at least in part, on the application related information and a UE configuration associated with user privacy, wherein, when the UE configuration is set to not use network slice routing for the application, the data is routed via a default network slice.

17. The apparatus of claim 16,
wherein, when the UE configuration is set to use network slice routing for the application, the data is routed via a network slice indicated by the application related information.

18. The apparatus of claim 16,
wherein the UE configuration is indicated by the application via a Boolean flag or via a user interface setting.

19. The apparatus of claim 16,
wherein, to receive, from the AMF of the network, the application related information, the one or more processors are configured to:
transmit, to the AMF, a registration request message, wherein the registration request message includes an indication of network slice capability, wherein the network slice capability is indicated via a network slice capability information element.

20. The apparatus of claim 16,
wherein, to receive, from the AMF of the network, the application related information, the one or more processors are configured to:
receive, from the AMF of the network, a policy message, wherein the policy message includes an application category to network slice identifier (ID) mapping, and wherein the determination of the traffic routing for data associated with the application is further based, at least in part, on the mapping.

* * * * *